United States Patent [19]

Shikata

[11] Patent Number: 4,936,430
[45] Date of Patent: Jun. 26, 1990

[54] CONTROL HYDRAULIC CIRCUIT FOR SPEED CHANGE CLUTCH

[75] Inventor: Kiyoshi Shikata, Neyagawa, Japan

[73] Assignee: Kabushiki Kaisha Daikin Seisakusho, Osaka, Japan

[21] Appl. No.: 331,317

[22] Filed: Mar. 31, 1989

[30] Foreign Application Priority Data

Apr. 4, 1988 [JP] Japan ............... 63-45448[U]

[51] Int. Cl.⁵ ............... B60K 41/22; F16D 25/11
[52] U.S. Cl. ............... 192/3.58; 192/87.13; 192/87.19
[58] Field of Search ............... 192/3.58, 87.13, 87.18, 192/87.19, 87.14; 137/637.1

[56] References Cited

U.S. PATENT DOCUMENTS

| 4,262,554 | 4/1981 | Ahlen et al. ............... 137/637.1 X |
| 4,729,408 | 3/1988 | Coutant ............... 137/637.1 |
| 4,817,770 | 4/1989 | Coutant ............... 192/3.58 |

FOREIGN PATENT DOCUMENTS 0184730 11/1982 Japan ............... 192/87.14

Primary Examiner—Rodney H. Bonck
Attorney, Agent, or Firm—Armstrong, Nikaido, Marmelstein, Kubovcik & Murray

[57] ABSTRACT

A working oil is supplied to a first set of clutch through a first control valve when the first control valve is functioning. The working oil is supplied to a second set of clutch through a second control valve, a third control valve and a fourth control valve when the second control valve is functioning and third and fourth control valves are not functioning. The working oil is supplied to a third set of clutch through the second control valve, the fourth control valve and the third control valve when the second and third control valves are functioning and the fourth control valve is not functioning. The working oil is supplied to a fourth set of clutch through the second control valve and the fourth control valve when the second and fourth control valves are functioning.

4 Claims, 2 Drawing Sheets

CONTROL HYDRAULIC CIRCUIT FOR SPEED CHANGE CLUTCH

BACKGROUND OF THE INVENTION

1INDUSTRIAL USEFUL FIELD

This invention relates to a control hydraulic circuit for a speed change clutch applied, for example, to a power transmission of a rough terrain crane etc.

2PRIOR ART

In case of a power transmission such as that of a rough terrain crane etc., for example, in which speed change stages of three forward speeds and one reverse speed are incorporated, clutches acting on respective speed change stages are installed separately, and each clutch actuates each speed change stage independently: a control hydraulic circuit controlling each clutch has conventionally been designed as diagrammatically illustrated by FIG. 2. Namely, in FIG. 2, when a control signal is given to a solenoid for a first spring return type solenoid valve 51. The first solenoid valve 51 actuates to feed pilot pressure oil from a hydraulic power supply through a regulator valve and the first solenoid valve 51 to a first control valve 52. Thereby, the first control valve 52 works, driving pressure oil is fed through the regulator valve, a modulator valve 53 and the first control valve 52 to a reverse clutch 54, and the reverse clutch 54 is actuated to change the speed stage to the reverse speed. Further, when the control signal is given to a solenoid of a spring return type second solenoid valve 56, the second solenoid valve 56 actuates to feed pilot pressure oil from the hydraulic power supply through the regulator valve and the second solenoid valve 56 to a second control valve 57. Thereby, the second control valve 57 works, the driving pressure oil is fed through the regulator valve, the modulator valve 53 and the second control valve 5? to a third-speed clutch 58, and the third speed clutch 18 is actuated to change the speed stage to the third speed. Further, when the control signal is given to a solenoid of a spring return type third solenoid valve 60, the third solenoid valve 60 actuates to feed the pilot pressure oil from the hydraulic power supply through the regulator valve and the third solenoid valve 60 to a third control valve 61.

Thereby, the third solenoid valve 61 works, the driving pressure oil is fed through the regulator valve, the modulator valve 53 and the third control valve 61 to a second-speed clutch 62, and the second-speed clutch 62 is actuated to change the speed stage to the second speed. Further, when the control signal is given to a solenoid of a spring return type fourth solenoid valve 64, the fourth solenoid valve 64 actuates to feed the pilot pressure oil from the hydraulic power supply through the regulator valve and the fourth solenoid valve 64 to a fourth control valve 65. Thereby, the fourth control valve 65 works, the driving pressure oil is fed through the regulator valve, the modulator valve 53 and the fourth control valve 65 to a first-speed clutch 66. and the first-speed clutch 66 is actuated to change the speed stage to the first speed. A spool of the first control valve 52 is connected to a spool of the second control valve 57 by a spring 68. Accordingly, under a state where the pilot pressure oil is fed to the first control valve 52 to cause the spool of the first control valve 62 to compress the spring 68 for example, the spool of the second control valve 57 can not further compress the spring is even when the pilot pressure oil is fed to the second control valve 57, so that the second control valve does not work. In the same way, under a state where the second control valve 57 is working, the first control valve 52 does not work even when the pilot pressure oil is fed to the first control valve 52. Further, a spool of the third control valve 61 is connected to a spool of the fourth control valve 65 by a spring 69. Accordingly, under a state where the pilot pressure oil is fed to the third control valve 61 to cause the spool of the third control valve 61 to compress the spring 69 for example, the spool of the fourth control valve 65 can not further compress the spring 69 even when the pilot pressure oil is fed to the fourth control valve 65, so that the fourth control valve 65 does not work. In the same way. Under a state where the fourth control valve 65 is working, the third control valve 61 does not work even when the pilot pressure oil is fed to the third control valve 61.

In the above-mentioned structure, however, the first control valve 52 does not work simultaneously with the second control valve 57 and the third control valve 61 does not work simultaneously with the fourth control valve 65, so that the reverse clutch 54 does not work simultaneously with the third-speed clutch 58 and the second speed clutch 61 does not work simultaneously with the first-speed clutch 66. Therefore, there are possibilities that the reverse clutch 54 works simultaneously with the second-speed clutch 62 or the first-speed clutch 66, and that the third-speed clutch 58 works simultaneously with the second-speed clutch 62 or the first-speed clutch 60. In this case, a so called locking state occurs wherein transmission of power becomes impossible. There±ore, seizure of clutch or breakage of other components have sometimes arisen. In case where the control signal is kept given to the second solenoid valve 56 even after the control signal has been given to the third solenoid valve 60 due to failure of a control unit or the spool of the second control valve 57 can not return because dust adheres to the spool, when the speed stage is shifted down from the third speed to the second-speed, for example; both the third-speed clutch 58 and the second-speed clutch 62 work simultaneously each other to cause the locking state.

SUMMARY OF THE INVENTION

OBJECT OF THE INVENTION

An object of &he invention is to provide a control hydraulic circuit for a speed change clutch, in which working pressure oil is not supplied simultaneously to plural sets of clutch even when a first control valve works simultaneously with a third control valve or a fourth control valve, or a second control valve works simultaneously with the third control valve or the fourth control valve, for some reason or other. Namely, the object is to provide a control hydraulic circuit for a speed change clutch which does not fall into a so-called locking state wherein clutches of plural speed stages work simultaneously to make a transmission of power impossible, so as to preferably avoid a seizure of clutch and breakage of other components caused by the locking state.

Another object of the invention is to provide a control hydraulic circuit for a speed change clutch, in which the above-mentioned object can be accomplished without requiring an increase in quantity of and a change in design of its component and without accompanying a cost-up thereof as compared with a conventional hydraulic circuit.

STRUCTURE OF THE INVENTION

In order to accomplish the above-mentioned object, the control hydraulic circuit for the speed change clutch according to the present invention comprises a control hydraulic circuit controlling four sets of clutch provided separately corresponding to each speed change stage of totally four stages; including first and second control valves actuated by pllot pressures respectively and prevented from getting into simultaneous functioning states. Third and fourth control valves actuated by pilot pressures respectively, and first through fourth solenoid valves actuated by control signals to supply pilot pressures to the foregoing first through fourth control valves respectively; and being so piped that a working oil is supplied to the first set of clutch among the foregoing four sets through the first control valve when the foregoing first control valve is actuated, the working oil is supplied to the second set of clutch through the second control valve, the third control valve and the fourth control valve when the foregoing second control valve is actuated and the foregoing third and fourth control valves are not actuated, the working oil is supplied to the third set of clutch through the second control value. The fourth control valve and the third control valve when the foregoing second and third control valves are actuated and the foregoing fourth control valve is not actuated, and the working oil is supplied to the fourth set of clutch through the second control valve and the fourth control valve when the foregoing second and fourth control valves are actuated.

BRIEF DESCRIPTION OF THE DRDAWINGS

DETAILED DESCRIPTION OF THE INVENTION

EMBODIMENT

Figure 1:
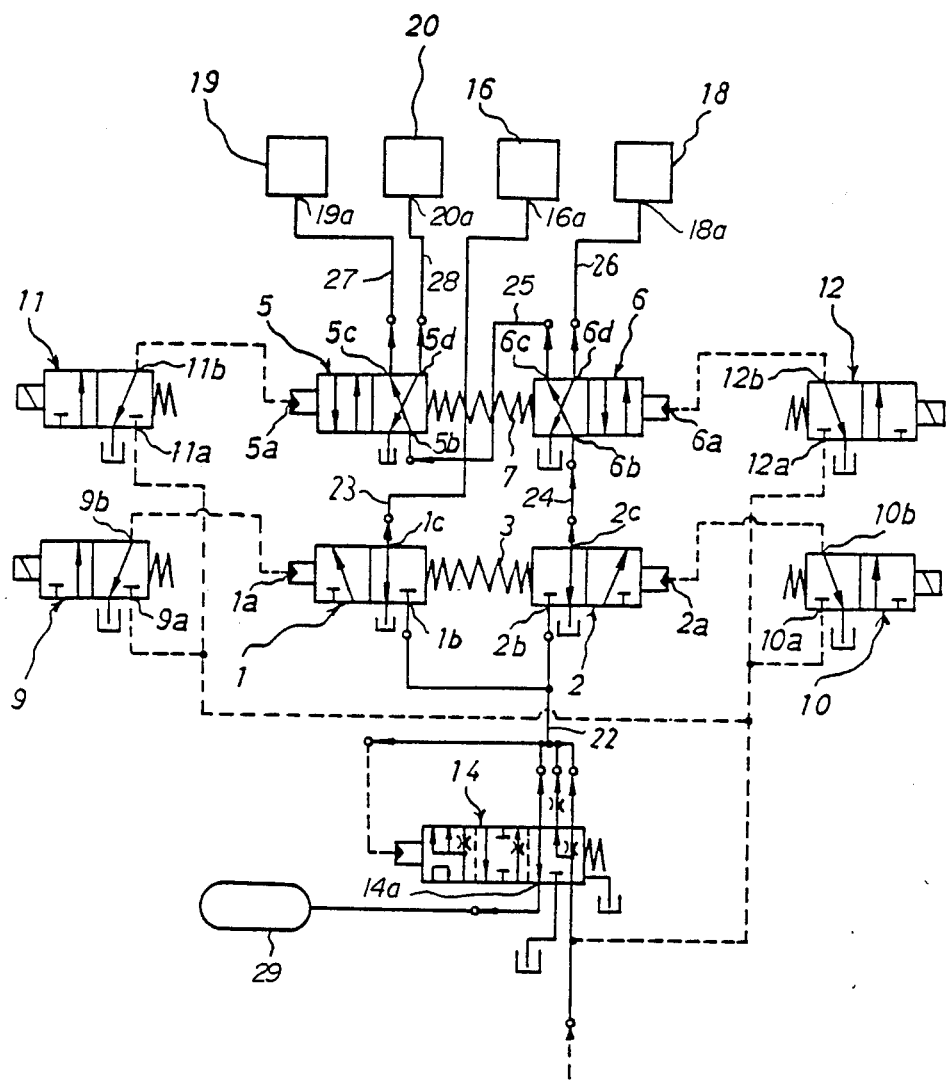
FIG. 1 is a circuit diagram of a control hydraulic circuit for speed change clutch of an embodiment according to this invention.
Figure 2:
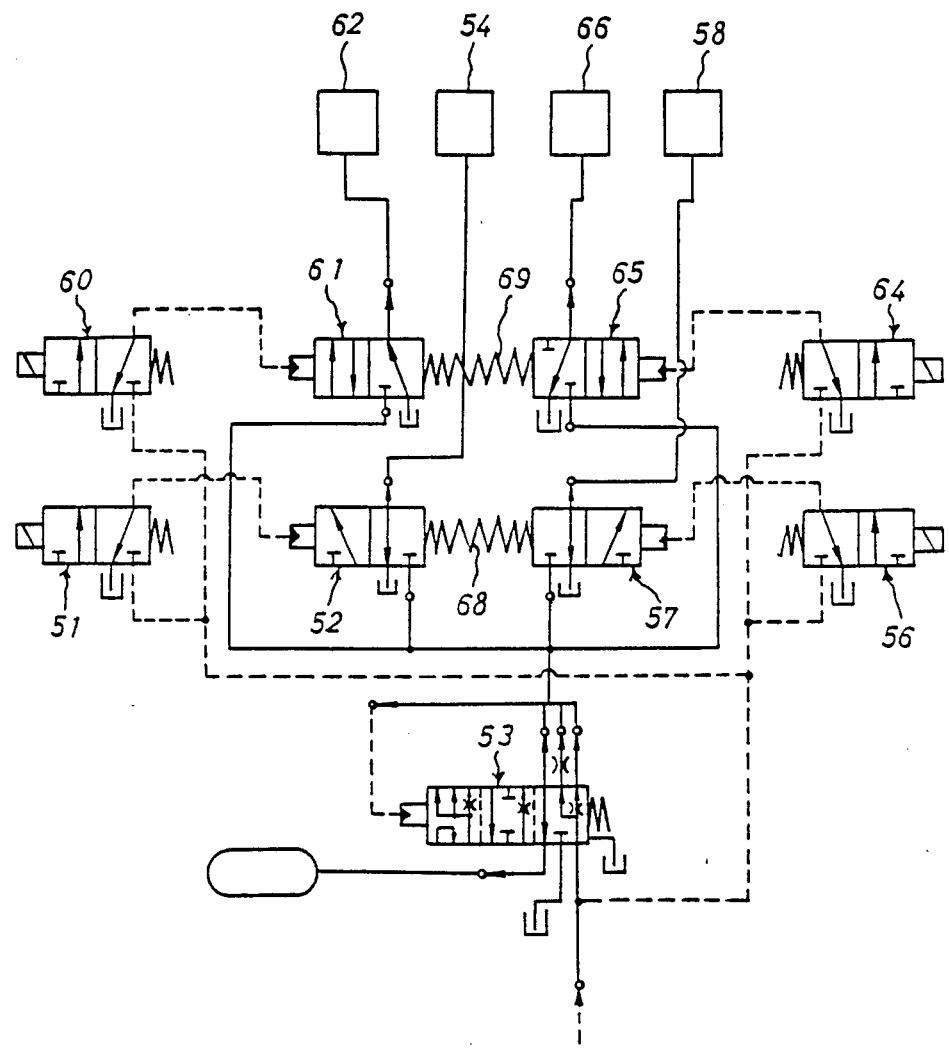
FIG. 2 is a circuit diagram of a control hydraulic circuit for a conventional speed change clutch.

As illustrated in FIG. 1, a first control valve 1 is actuated for changeover by supplying a pilot pressure oil to a control port 1a. A second control valve 2 is actuated for changeover by supplying the pilot pressure oil to a control port 2a. A spool (not shown) of the first control valve 1 and a spool (not shown) of the second control valve 2 are connected together by a spring 3. Therefore, under a state where the pilot pressure oil is not concurrently supplied to both the control port 1a and the control port 2a, neither the first control valve 1 nor the second control valve 2 function so that a state of hydraulic connection as illustrated by FIG. 1 is brought about. Further, while the first control valve 1 is functioning, the pilot pressure oil is supplied to the control port 1a and the spool of the first control valve 1 moves to a right side of FIG. 1 to press on the spool of the second control valve 2 through the spring 3. Consequently even when the pilot pressure oil is supplied to the control port 2a, the spool of the second control valve 2 does not move to a left side of FIG. 1 so that the second control valve 2 does not function. On the contrary, while the second control valve 2 is functioning. The pilot pressure oil is supplied to the control port 2a and the spool of the second control valve 2 moves to the left side of FIG. 1 to press on the spool of the first control valve 1 through the spring Consequently, even when the pilot& pressure oil is supplied to the control port 1a, the spool of the first control valve 1 does not move to the right side of FIG. 1 so that the first control valve 1 does not function.

A third control valve 5 is actuated for changeover by supplying the pilot pressure oil to a control port 5a. A fourth control valve 6 is actuated for changeover by supplying the pilot pressure oil to a control port 6a. A spool (not shown) of the third control valve 5 and a spool (not shown) of the fourth control valve 6 are connected together by a spring 7. Therefore, under a state where the pilot pressure oil is not concurrently supplied to both the control port 5a and the control port 6a, both the third control valve 5 and the fourth control valve 6 do not function so that the state of hydraulic connection as illustrated by FIG. 1 is brought about. Further, while the third control valve 5 is functioning, the pilot pressure oil is supplied to the control port 5a and the spool of the third control valve moves to the right side of FIG. 1 to press on the spool of the fourth control valve 6 through the spring 7. Consequently, even when the pilot pressure oil is supplied to the control port 6a, the spool to the control valve 6 does not move to the left side of FIG. 1 so that the fourth control valve 6 does not function. On the contrary, while the fourth control valve 6 is functioning, the pilot pressure oil is supplied to the control port 6a and the spool of the fourth control valve 6 moves to the left side of FIG. 1 to press on the spool of the third control valve 5 through the spring 7. Consequently, even when the pilot pressure oil is supplied to the control port 5a, the spool of the third control valve 5 does not move to the right side of FIG. 1 so that the third control valve 5 does no function.

A spring-return type first solenoid valve 9 supplies the pilot pressure oil to the control port 1a of the first control valve 1. A spring-return type second solenoid valve 10 supplies the pilot pressure oil to the control port 2a of the second control valve 2. A spring-return type third solenoid valve 11 supplies the pilot pressure oil to the control port 5a of the third control valve 5. A spring-return type fourth solenoid valve 12 supplies the pilot pressure oil to the control port 6a of the fourth control valve 6. The pilot pressure oil is supplied from the hydraulic power supply through the regulator valve to the inlet side ports 9a, 10a, 11a & 12a of these solenoid valves 9, 10, 11 & 12.

An outlet side port 9b of the first solenoid valve 9 is connected to the control port 1a of the first control valve 1. An outlet side port 10b of the second solenoid valve 10 is connected to the control port 2a of the second control valve 2. An outlet side port 11b of the third solenoid valve 11 is connected to the control port 5a of the third control valve 5. An outlet side port 12b of the fourth solenoid valve 12 is connected to the control port 6a of the fourth control valve 6.

The working pressure oil is supplied to an inlet side port 1b of the first control valve 1 and an inlet side port 2b of the second control valve 2 through a modulator valve 14. Which serves for smoothing engaging/disengaging actions between the regulator valve and a clutch to moderate a speed change shock, and a piping 22. An outlet side port 1c of the first control valve is connected through a piping 23 to a working pressure oil inlet port 16a of a reverse clutch 16 serving as the first set of clutch. An outlet side port 2c of the second control valve 2 is connected through a piping 24 to an inlet side port 6b of the fourth control valve 6. A first outlet side port 6c of the fourth control valve 6 is connected through a piping 25 to an inlet side port 5b of the third control valve 5. A second outlet side port 6d of the fourth control valve 6 is connected through a piping 26 to a working pressure oil inlet port 18a of a first-speed clutch 18 serving as the fourth set of clutch. A first outlet side port 5c of the third control valve 5 is connected through a piping 27 to a working pressure oil inlet port 19a of a third-speed clutch 19 serving as the second set of clutch. A second outlet side port 5d of the third control valve 5 is connected through a piping 28 to a working pressure oil inlet port 20a of a second speed clutch 20 serving as the third set of clutch. The clutches 16, 18, 19 & 20 of each set may be composed of one clutch respectively, or may be composed of plural clutches respectively. A modulator tank 29 is connected to a port 14a of a modulator valve 14.

FUNCTION OF THE INVENTION

Function will be described hereunder. When a solenoid of the first solenoid valve 9 is energized, the first solenoid valve 9 is actuated to connect the inlet side port 9a with the outlet side port 9b. Thereby, the pilot pressure oil is supplied through the first solenoid valve 9 to the control port 1a of the first control valve 1, so that the first control valve 1 is actuated to connect the inlet side port 1b with the outlet side port 1c. Thereby, working pressure oil is supplied &o the reverse clutch 16 through the piping 22, the first control valve 1 and the piping 23 so that the reverse clutch 16 is actuated to change the speed stage to the reverse drive.

When a solenoid of the second solenoid valve 10 is energized, the second solenoid valve 10 is actuated to connect the inlet side port 10a with the outlet side port 10b. Thereby, the pilot pressure oil is supplied to the control port 2a of the second control valve 2 through the second solenoid valve 10, so that &he second control valve 2 is actuated to connect the inlet side port 2b with the outlet side port 2c. Supposing that both the third solenoid valve 11 and the fourth solenoid valve 12 are not energized in this instance, the third control valve 5 and the fourth control valve 6 are not functioning, so that inlet side port 5b of the third control valve 5 is connecting with the first outlet side port 5c and the inlet sIde port 6b to the fourth control valve 6 is connecting with the first outlet port 6c. Therefore, the working pressure oil is supplied to the third speed clutch 19 through the piping 22, the second control valve 2, the piping 24, the fourth control valve 6, the piping 25, the third control valve 5 and the piping 27. so that the third-speed clutch 19 is actuated to change the speed stage to the third speed.

when solenoids of the second solenoid valve 10 and the third solenoid valve 11 are energized, the second solenoid valve 10 is actuated to connect the inlet side port 10a with the outlet side port 10b and at the same time the third solenoid valve 11 is actuated to connect the inlet side port 11a with the outlet side port 11b. Thereby, the pilot pressure oil is supplied through the second solenoid valve 10 to the control port 2a of the second control valve 2 to connect the inlet side port 2b with the outlet side port 2c, and at the same time the pilot pressure oil is supplied through the third solenoid valve 11 to the control port 5a of the third control valve 5 so that the third control valve 5 is actuated to connect the inlet port 5b with the second outlet port 5d.

In this instance, the fourth control valve 6 is not functioning so that the inlet side port 6b of the fourth control valve 6 is connected with the outlet side port 6c thereof. Therefore, the working pressure oil is supplied to the second-speed clutch 20 through the piping 22, the second control valve 2, the piping 24, the fourth control valve 6. The piping 25 the third control valve 5 and the piping 28, so that the second-speed clutch 20 is actuated to change the speed stage to the second speed.

When solenoids of the second solenoid valve 10 and the fourth solenoid valve 12 are energized, the second solenoid valve 10 is actuated to connect the inlet side port 10a with the outlet side port 10b, and at the same time the fourth solenoid valve 12 is actuated to connect the Inlet side port 12a with the outlet side port 12b. Thereby, the pilot pressure oil is supplied through the second solenoid valve 10 to the control port 2a of the second control valve 2 so that the second control valve 2 is actuated to connect the inlet side port 2b with the outlet side port 2c, and at the same time the pilot pressure oil is supplied through the fourth solenoid valve 12 to the control port 6a of the fourth control valve 6 so that the fourth control valve 6 is actuated to connect the inlet side port 6b with the second outlet side port 6d. Therefore, &he working pressure oil is supplied to the first-speed clutch 18 through the piping 22, the second control valve 2, the piping 24, the fourth control valve 6 and the piping 26, so that the first-speed clutch 18 is actuated to change the speed stage to the first speed.

Since the first control valve does not function simultaneously with the second control valve 2, the working pressure oil is never supplied to the second-speed clutch 20 or the first speed clutch 18 because the inlet side port 2b of the second control valve 2 does not connect to the outlet port 2c thereof, in the event when the third control valve 5 or the fourth control valve 6 should function during functioning of the first control valve for some reason or other. Further, in the event when the third control valve 5 or the fourth control valve 6 should function during functioning of the second control valve 2 for some reason or other, the working pressure oil having been supplied to the third-speed clutch 19 is only switched to be supplied to the second-speed clutch 20 or the first-speed clutch 18. Accordingly, there is no possibility that the working pressure oil is supplied to the third-speed clutch 19 and the second-speed clutch 20 or the first speed clutch 18, simultaneously. Because the first control valve 1 does not function simultaneously with the second control valve 2, there is naturally no possibility that the working pressure oil is supplied to both the reverse clutch 16 and the third-speed clutch 19 simultaneously. Moreover, the third control valve does not function simultaneously with the fourth control valve 6. However, in the event when they should function simultaneously, the working pressure oil will not be supplied to the third-speed clutch 19 and the second-speed clutch 20 but will be supplied to the first-speed clutch 18 because the inlet side for& 6b will stop connecting to the outlet side port 6c when the fourth control valve 6 functions.

As mentioned above, in the event when the first control valve 1 functions simultaneously with the third control valve 5 or the fourth control valve 6, or the second control valve 2 functions simultaneously with the third control valve 5 or the fourth control valve 6 for some reason or other: the working pressure oil is never supplied to two sets of clutch simultaneously. Therefore, there is no possibility that the control hydraulic circuit does not fall into a so-called locking state wherein clutches of plural speed stages function simultaneously to make a transmission of power impossible, so as to securely avoid a seizure of clutch and breakage of other components by the locking state.

Change-over valves so constructed as not to function simultaneously by the use of the spring 7, are used for the third control valve 5 and the fourth control valve 6 in the foregoing embodiment. However, the present invention is not necessarily limited to this structure but those functioning independently from each other may be used for the third control valve 5 and the fourth control valve 6.

Furthermore, in the foregoing embodiment; the example has been described wherein the first set of clutch is used for the reverse drive, the second set of clutch is used for the third-speed, the third set of clutch is used for the second-speed and the fourth set of clutch is used for the first speed, respectively. However, the present invention is not necessarily limited to such structure, but the way of making the first through fourth sets of clutch correspond to what speed change stage can be selected at will.

EFFECT OF THE INVENTION

According to the present invention as described above, in the event when the first control valve functions simultaneously with the third control valve or the fourth control valve, or the second control valve functions simultaneously with the third control valve or the fourth control valve for some reason or other, the working pressure oil is never supplied to plural sets of clutch simultaneously. Therefore, there is no possibility that the control hydraulic circuit falls into the so-called locking state wherein clutches of plural speed stages function simultaneously to make a transmission of power impossible, so as to securely avoid the seizure of clutch and breakage of other components by the locking state. Moreover, the increase in quantity of and change in design of components are not required at all as compared with conventional hydraulic circuits. So that the improvement in the hydraulic circuit can be accomplished without increasing the cost.

What is claimed is:

1. A hydraulic control circuit for controlling speed change clutches comprising a hydraulic control circuit for individually controlling each of four clutches, each clutch providing separate control for each of a total four speed stages; including first and second control valves each actuated by pilot pressure and interconnected for preventing concurrent actuation, third and fourth control valves each actuated by pilot pressure respectively, and first through fourth solenoid valves each actuated by a control signal to supply pilot pressure to said first through fourth control valves, respectively; said control valves being so piped with a working oil so that working oil is supplied to a first clutch of said four clutches through said first control valve when said first control valve is actuated, said working oil is supplied to a second clutch of said four clutches through said second control valve, said third control valve and said fourth control valve when said second control valve is actuated and said third and fourth control valves are not actuated, said working oil is supplied to a third clutch of said four clutches through said second control valve, said fourth control valve and said third control valve when said second and third control valves are actuated and said fourth control valve is not actuated, and said working oil is supplied to said fourth clutch of said four clutches through said second control valve and said fourth control valve when said second and fourth control valves are actuated.

2. A hydraulic control circuit for speed change clutches as set forth in claim 1; in which said first clutch of said four clutches is a reverse clutch, said second clutch of said four clutches is a third-speed clutch, said third clutch of said four clutches is a second-speed clutch and said fourth clutch of said four clutches is a first-speed clutch.

3. A hydraulic control circuit for speed change clutches as set forth in claim 1 or claim 2, in which said third and fourth control valves are interconnected for preventing concurrent actuation.

4. A hydraulic control circuit for speed change clutches as set forth in claim 1, in which said working oil is supplied through a modulator valve.

* * * * *